United States Patent [19]

Grollimund et al.

[11] 4,346,284
[45] Aug. 24, 1982

[54] DUAL PATH WEB TRANSPORT AND PROCESSING APPARATUS WITH RADIANT ENERGY DIRECTING MEANS

[75] Inventors: Everett C. Grollimund, Midlothian; Peter Martin, Richmond, both of Va.

[73] Assignee: Philip Morris Incorporated, New York, N.Y.

[21] Appl. No.: 160,450

[22] Filed: Jun. 18, 1980

[51] Int. Cl.³ ............................................. B23K 27/00
[52] U.S. Cl. ...................... 219/121 LK; 219/121 LG; 219/121 LT; 219/121 LY
[58] Field of Search .... 219/121 L, 121 LM, 121 LK, 219/121 LL, 121 LN, 121 LG, 121 LS, 121 LT, 121 LU, 121 LV, 121 LW, 121 LY, 384

[56] References Cited

U.S. PATENT DOCUMENTS

| | | | |
|---|---|---|---|
| 3,256,524 | 6/1966 | Stauffer | 219/121 LK X |
| 3,262,122 | 7/1966 | Fleisher et al. | 219/121 LT X |
| 3,582,466 | 6/1971 | Quirk | 219/121 LY X |
| 4,049,945 | 9/1977 | Ehlscheid et al. | 219/121 LY X |
| 4,118,619 | 10/1978 | McArthur et al. | 219/121 LK |
| 4,149,918 | 4/1979 | Cislak | 219/121 LY |
| 4,158,762 | 6/1979 | Saunders | 219/121 LY |
| 4,161,808 | 7/1979 | Wittstock | 219/121 LG X |
| 4,218,606 | 8/1980 | Whitman | 219/121 LK |

FOREIGN PATENT DOCUMENTS

| | | | |
|---|---|---|---|
| 52-28095 | 3/1977 | Japan | 219/121 LT |
| 52-39893 | 3/1977 | Japan | 219/121 LT |

*Primary Examiner*—C. L. Albritton
*Attorney, Agent, or Firm*—Arthur I. Palmer; George M. J. Sarofeen

[57] ABSTRACT

An apparatus and method for processing a sequence of webs by exposure to radiant energy. The apparatus includes structure defining a pair of independent transport paths and apparatus for emitting radiant energy and selectively directing it into either of two treatment zones, the respective treatment zones being aligned with the respective transport paths. The radiant energy is directed into the treatment zone aligned with each transport path while a web is being fed along such path. The leading end of each web is threaded along one of the transport paths while a web is being fed and treated on the other path, so the radiant energy emitting portion of the apparatus is not idle during threading.

13 Claims, 3 Drawing Figures

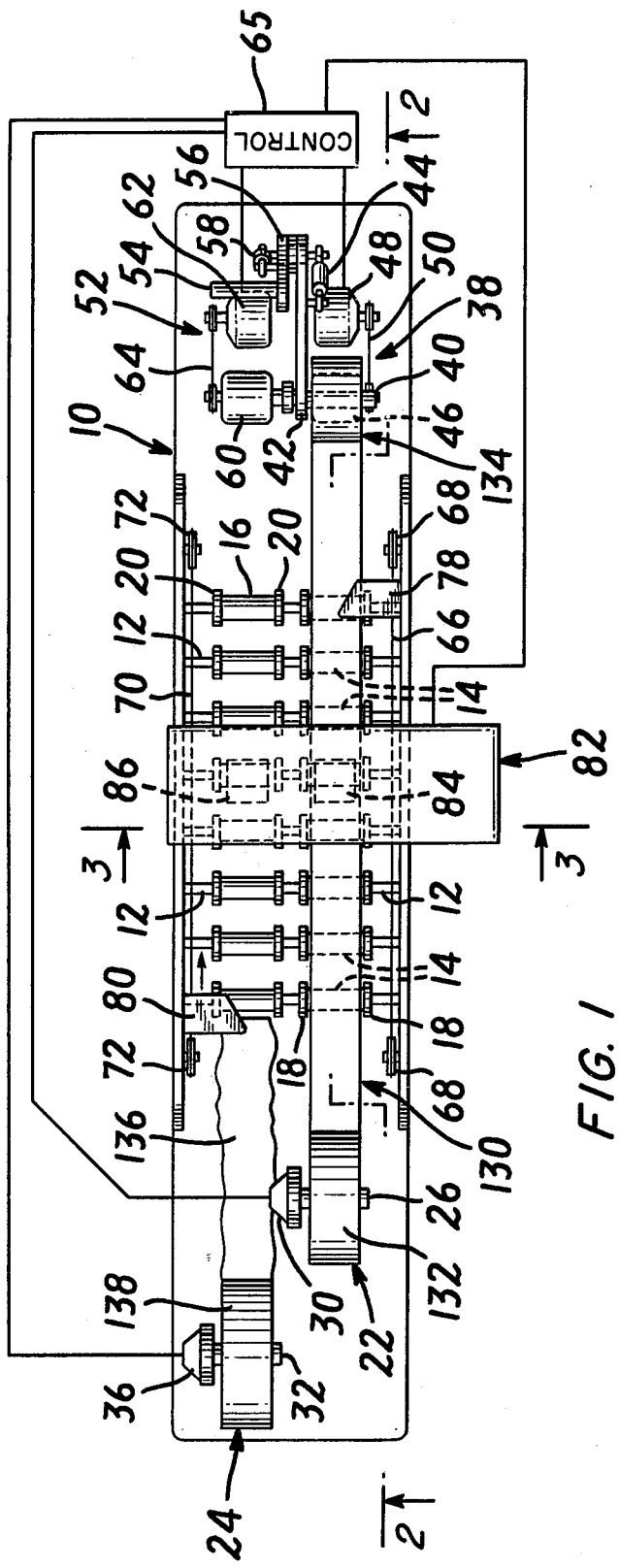
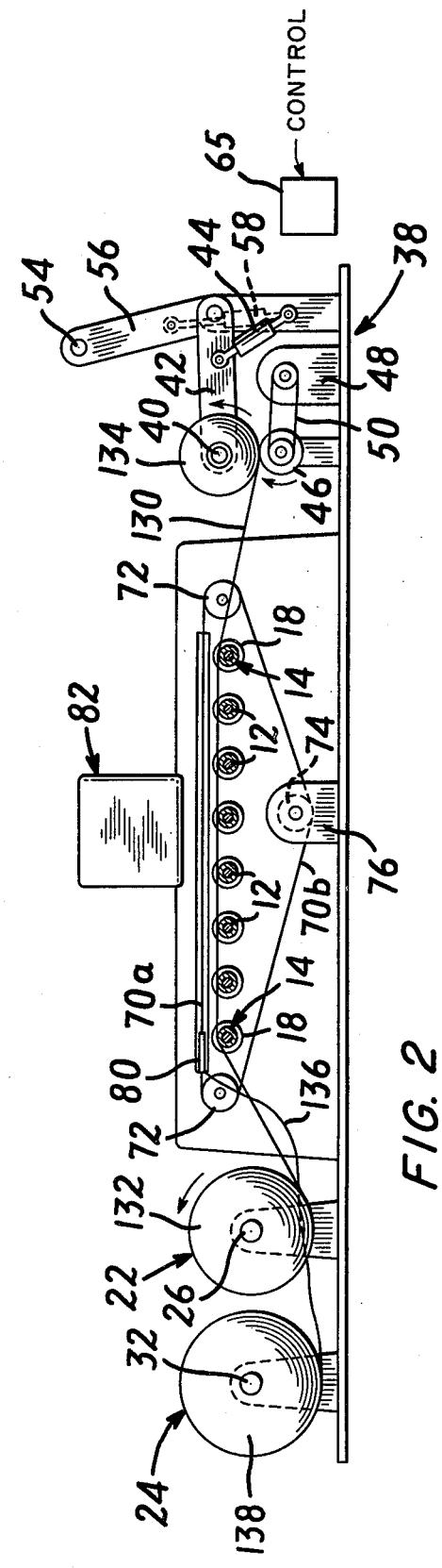
FIG. 1
FIG. 2

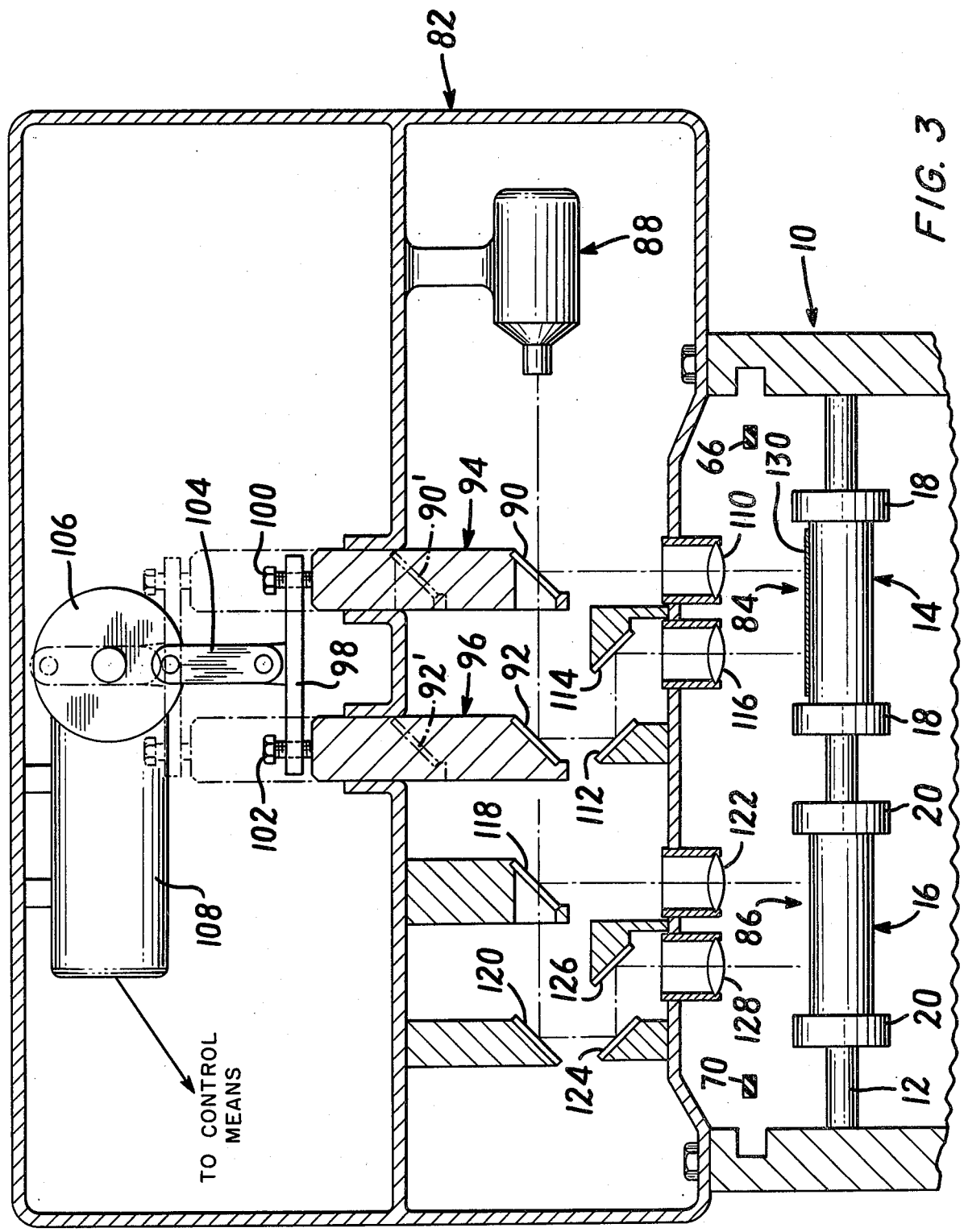

DUAL PATH WEB TRANSPORT AND PROCESSING APPARATUS WITH RADIANT ENERGY DIRECTING MEANS

BACKGROUND OF THE INVENTION

The present invention relates to web processing, and more particularly relates to a method and apparatus for processing webs by exposing them to radiant energy.

In numerous industrial applications, webs of flat materials such as paper, plastics, foils and the like are treated by exposing them to radiant energy. Ordinarily, the materials to be treated are supplied as a series of semi-continuous webs. The supply coil containing each web is loaded into a payout stand and the leading end of the web is threaded along a transport path to a takeup stand. The web is then transported along the path by winding it onto a takeup coil at the takeup stand while unwinding it from the supply coil at the payout stand. As each web is fed along the transport path in this manner, beams of radiant energy impinge upon it and treat it. One application of this technique is the perforation of cigarette tipping paper by exposure to pulsed beams of light from a laser.

Although webs can be treated at extremely high speeds by certain types of radiant energy devices, the productive capacity of the apparatus heretofore available for such treatment has been significantly impaired by loss of productive time during unloading and reloading. With the apparatus of the prior art, the radiant energy emitting portion of the apparatus has been idle while each treated web is unloaded from the takeup stand and the next web is loaded into the payout stand and threaded along the transport path. Modern apparatus for perforating cigarette tipping paper with laser light can process a web of paper at linear speeds of up to 7,000 feet per minute. Even if each web is as long as can be accommodated in a coil of reasonable size, apparatus running at this speed will require reloading after only about 2 to 3 minutes of operation. If the apparatus is idle for only 1 minute during each unloading and reloading cycle, from 25 to 33 percent of its productive capacity will be lost.

BRIEF SUMMARY OF THE INVENTION

It is an object of the present invention to minimize such loss of productive capacity in web treatment apparatus employing radiant energy.

It is another object of the present invention to provide web treatment apparatus employing radiant energy which apparatus is capable of being loaded and unloaded while it is actively processing a web but which can be loaded and unloaded safely.

The apparatus of the present invention includes a web support structure which defines two independent transport paths, and also includes means for emitting radiant energy. Means for selectively directing the radiant energy so emitted along either of two routes are provided. When the radiant energy is directed along a first one of the routes it extends to a first treatment zone which is aligned with a first one of the transport paths. When the beam is directed along a second one of the routes it extends to a second treatment zone aligned with the other one of the transport paths. The apparatus includes two payout stands and two takeup stands. One of the payout stands and one of the takeup stands are associated with each of the transport paths.

A web can be fed along either one of the transport paths by the payout and takeup stands associated with such path while the payout and takeup stands associated with the other path are being loaded and unloaded and while a newly-loaded web is being threaded along such other path between the associated payout and takeup stands. The beam directing means is operated so as to direct the radiant energy along the route extending to the treatment zone aligned with each path while a web is being transported along such path so that the radiant energy will impinge on such web.

Thus, each web in a series of semi-continuous webs can be processed by feeding it along one of the transport paths while the payout and takeup stands associated with the other path are being reloaded and unloaded and while the other path is being threaded. When the web being fed is exhausted, the beam is redirected into the treatment zone aligned with the other path and the takeup stand associated with such other path is started to accelerate the newly-loaded web on such other path to full processing speed. The radiant energy emitting means will not be idle during unloading, reloading and threading. The apparatus will be productive except during the very brief periods required to redirect the beam and accelerate the new web to full processing speed.

Preferably, the radiant energy emitting means is arranged to emit a single beam of radiant energy on a fixed beam path and the means for selectively directing the radiant energy includes an optical element and means for moving the optical element between first a second operating positions. When the optical element is in the first position, the beam will impinge on the optical element and will be directed along the first route to the first treatment zone, but when the optical element is in the second position the beam will extend along the second route to the second treatment zone. If this arrangement is utilized, there is no need to move the radiant energy emitting means. Therefore, the beam can be quickly redirected. Delicate emitting means such as a laser can be successfully employed without fear of damage caused by movement.

Control means are preferably provided for coordinating the operation of the beam directing means with the operation of the payout and takeup stands so that a web extending along each transport path will be accelerated to full processing speed while the beam is being redirected towards the treatment zone aligned with such path. Thus, the time spent in accelerating a new web to processing speed will be coincident with the time required to redirect the beam so as to impinge upon such web, and the loss of productive time during such redirection and acceleration will be minimized.

These and other objects, features and advantages of the present invention will be more readily apparent from the following detailed description of the preferred embodiment when read in conjunction with the accompanying drawings, in which like reference numerals are used to denote like features in the various views.

BRIEF DESCRIPTION OF THE DRAWINGS

FIG. 1 is a schematic top plan view of apparatus according to a preferred embodiment of the present invention.

FIG. 2 is a sectional elevational view taken along line 2—2 in FIG. 1.

FIG. 3 is a fragmentary sectional view on an enlarged scale, taken along line 3—3 in FIG. 1.

DETAILED DESCRIPTION OF THE PREFERRED EMBODIMENTS

As shown in FIGS. 1 and 2, apparatus according to the preferred embodiment of the present invention includes a frame 10, on which is mounted a plurality of parallel horizontal shafts 12. A first set of rollers 14 and a second set of rollers 16 are rotatably mounted on the shafts 12 so that the rollers 14 of the first set are disposed in a first row and the rollers 16 of the second set are disposed in a second, parallel row. Each of the rollers 14 and 16 is independently rotatable with respect to the shaft 12 on which it is mounted so that the rollers 14 of the first set can be rotated without rotating the rollers 16 of the second set.

A web which extends over either set of rollers can be moved longitudinally of the rollers, and a web extending on either set of rollers can be moved regardless of whether or not a web on the other set of rollers is moving at the same time. Also, a web disposed on either set of rollers will not contact a web disposed on the other set of rollers. Therefore, the two sets of rollers define two independent transport paths. As used herein, the term "transport path" should be taken as referring to any structurally defined route along which a web may be moved. Two transport paths will be characterized herein as "independent" if a web can be moved along one of such paths regardless of whether or not a web is simultaneously present on the other one of such paths.

Each roller 14 of the first set includes a pair of guide flanges 18 at its ends, and each roller 16 of the second set has a similar pair of guide flanges 20. These flanges will prevent any web conveyed along the rollers from shifting sideways off the ends of the rollers.

A first payout stand 22 and a second payout stand 24 are disposed at the upstream ends of the first and second transport paths respectively, with the first payout stand including a horizontally extending supply coil shaft 26 rotatably supported by the frame 10 and a brake 30 selectively engageable with the shaft 26 to retard its rotation. The second payout stand 24 includes a similar coil support shaft 32 and brake 36.

A first takeup stand 38 is positioned at the downstream end of the first transport path and includes a takeup coil support shaft 40 which is rotatably mounted on an arm 42 which in turn is pivotally mounted to the frame. A fluid operated cylinder 44 (FIG. 2) is connected with the arm and the frame so that the cylinder can be operated to bias the arm in either direction. The first takeup stand 38 also includes a drive roller 46 which is rotatably supported by the frame so that when the arm 42 extends generally horizontally, the coil support shaft 40 overlies the drive roller 46. A drive motor 48 is connected with the drive roller 46 by a belt 50.

A second takeup stand 52 (FIG. 1) is disposed at the downstream end of the second transport path. The second takeup stand includes a coil support shaft 54, an arm 56, a fluid cylinder 58, a drive roller 60, a motor 62 and a drive belt 64, which are arranged similarly to the corresponding components of the first takeup stand 38. Although the arm 56 of the second takeup stand is depicted in the drawings in its uppermost position, this arm can also be pivoted downwardly by the associated fluid cylinder 58 to a position in which the coil support shaft 54 will overlie the drive roller 60.

A control unit 65 is operatively connected with the motors 48 and 62 of the takeup stands, and to the brakes 30 and 36 of the payout stands, so that the unit can control the operation of all of these components.

Apparatus for mechanically threading a web along either of the transport paths is as shown in FIG. 1, this apparatus including a first chain 66 which is disposed adjacent to the first transport path on a pair of rotatable support sprockets 68 and a second chain 70 which is disposed adjacent to the second transport path on a similar pair of support sprockets 72. Although each of the chains 66 and 70 extends parallel to the adjacent transport path, the chains do no overlie the rollers 14 and 16 which define the transport paths. As seen in FIG. 2, the top run 70a of the second chain 70 extends above the level of the rollers, and the bottom run 70b of the chain 70 extends around a drive sprocket 74 which is connected to a drive motor 76. The first chain 66 is similarly arranged, and a similar drive apparatus is provided for it. The drives associated with the chains are arranged so that each chain can be selectively moved in either direction, independently of any movement of the other chain.

A gripper or carrier 78 is fixed to the first chain and slidably supported by the frame of the apparatus. A similar gripper or carrier 80 is fixed to the top run of the second chain 70 and is also slidably supported by the frame. Thus, the chains and the associated drive apparatus can be operated to move the first gripper 78 upstream or downstream over the rollers 14 of the first transport path, and can also be operated to move the second gripper 80 upstream or downstream over the rollers 16 of the second transport path. Each gripper can be selectively actuated to engage or disengage the leading end of a web which extends from the payout stand associated with the adjacent transport path.

Radiant energy emitting means and selectively operable radiant energy directing means are provided within a housing 82 for producing radiant energy and selectively directing it either to a first treatment zone 84 (FIG. 2) aligned with the first transport path or to a second treatment zone 86 aligned with the second transport path.

As seen in FIG. 3, the housing 82 is fixed to the frame 10 of the apparatus. A laser 88 is fixed to the housing 82. The laser 88 emits a pulsatile beam of light along a fixed beam path which extends horizontally from the laser towards the left as seen in FIG. 3.

A first beam splitter 90 and a first mirror 92 are each slidably mounted to the housing by means of respective carriers 94 and 96. These carriers, in turn, are connected to a cross beam 98 by means of adjusting bolts 100 and 102. The cross beam 98 is pivotally connected to a link 104 which in turn is pivotally connected to a crank wheel 106. The crank wheel 106 is rotatably mounted to the housing 82 and is linked to a stepper motor 108 which is connected to the control unit 65 (FIG. 1). Thus, the stepper motor 108 can be operated to elevate or lower the cross beam 98.

When the cross beam 98 is in its first or lower position, as depicted in solid lines in FIG. 3, the first mirror 92 and the first beam splitter 90 will both be in their respective first positions, depicted in solid lines. When the cross beam 98 is in its second or upper position, the first mirror and first beam splitter will be in their respective second or elevated positions 92' and 90', depicted in broken lines.

The first positions of the mirror 92 and the beam splitter 90 are aligned with the beam path of the laser unit 88. A lens 110 is disposed beneath the first beam splitter 90 so that light reflected from the beam splitter will pass through the lens and will be focused thereby. A pair of directing mirrors 112 and 114 and a lens 116 are associated with the first mirror 92 so that light reflected from it will be successively reflected by each of the directing mirrors and will pass through the lens 116. The lenses 110 and 116 are both positioned above the first transport path and any light passing through these lenses will be focused into points within the first treatment zone 84.

A second beam splitter 118 is fixed to the housing to the left of the first mirror 92. A second mirror 120 is fixed to the housing to the left of the second beam splitter 118 so that the second beam splitter is positioned in front of the second mirror. Both of these elements are positioned in the beam path of the laser unit 88. A lens 122 is mounted to the housing beneath the second beam splitter 118. A pair of directing mirrors 124 and 126 and a lens 128 are associated with the second mirror 120 so that any light reflected from it will be selectively reflected by these directing mirrors and will pass through the lens 128. The lenses 122 and 128 are both positioned above the the second transport path. A portion of any light which impinges on the beam splitter 118 will be reflected by the beam splitter into the lens 122 and focused by such lens into a point within the second treatment zone 86. The remaining portion of any light impinging on the second beam splitter 118 will pass through it to mirror 120 and such light will be directed through the lens 124 and focused into another point within the second treatment zone 86.

Thus, when the first mirror 92 and the first beam splitter 90 are in their respective first positions, any light emitted by the laser unit 88 will be directed along a first route, on beam paths extending through the lenses 110 and 116 into the first treatment zone 84. The mirror 92 will prevent any portion of such light from reaching the second beam splitter 118 of the second mirror 120, and thus none of such light will be directed through the lenses 122 and 124 into the second treatment zone. However, when the first mirror and the first beam splitter are in their respective second positions 92' and 90', as indicated in broken lines, they will not intercept the light emitted by the laser unit 88, and such light will therefore pass along a second route, including beam paths through the lenses 122 and 124 into the second treatment zone 86. Of course, when the first mirror and beam splitter are in their elevated or second positions, none of the light from the laser unit 88 will be directed along the first route into the first treatment zone 84.

As illustrated in the drawings, the apparatus is processing a web 130. This web extends along the first transport path from a supply coil 132 (FIG. 2) on the supply coil shaft 26 on the first payout stand 22 to a takeup coil 134 on the takeup coil support shaft 40 of the first takeup stand 38.

The takeup coil 134 bears against the drive roller 46 of the second takeup stand 38 so that as the drive motor 48 rotates the roller 46 clockwise the takeup coil 134 rotates counterclockwise so as to draw the web 130 from the supply coil 132 over the rollers 14 and along the first transport path. The brake 30 of the first payout stand retards the rotation of the supply coil so as to maintain tension in the web 130. As the web 130 is fed along the first transport path through the first treatment zone 84, the stepper motor 108 (FIG. 3) will maintain the first beam splitter 90 and the first mirror 92 in their respective first or beam intercepting positions.

Light emitted by the laser 88 will pass along the first route, through the lenses 110 and 116, into the first treatment zone 84 and will impinge upon the web 130. The laser is pulsed so that discrete bursts of light will impinge upon the web 130. The power of the laser and the positions of the lenses 110 and 116 are preselected so that the pulses of light impinging on the web 130 will burn holes of the desired size in it. The pulse frequency of the laser and the speed with which the web 130 is fed along the first transport path by the takeup stand 38 are preselected so as to place the holes at the desired spacing along the length of the web. In the arrangement illustrated, two parallel rows of holes will be formed in the web as it is fed through the first treatment zone 84.

While the first web 130 is being fed along the first transport path and processed by the radiant energy apparatus as described above, another web 136 can be loaded into the apparatus. As shown in the drawings, the supply coil 138 which contains this web has been loaded onto the supply coil shaft 32 of the second payout stand 24. The leading portion of the web 136 has been manually pulled from the supply coil and has been engaged with the second carrier or gripper 80. The chain drive motor 76 can now be actuated to draw the gripper 80 downstream (to the right in FIG. 1) so as to draw the leading end of the web 136 over the rollers 16 which define the second transport path. This will thread the web 136 along the second transport path, past the second treatment zone 86 to the downstream end of the second transport path. There is no need for an operator to manually thread the web through the treatment zone. Therefore, the operator will not be exposed to any of the light from the laser if the radiant energy directing apparatus malfunctions while the web 136 is being threaded.

After the leading end of the web 136 has been threaded to the downstream end of the second transport path, it is manually disengaged from the carrier 80 and manually pulled towards the second takeup stand 52. The leading end of the web 136 is then fixed to a spool and wrapped around the spool for a few turns to form the beginning of a new takeup coil. This takeup coil is placed on the takeup coil shaft 54 of the second takeup stand and the cylinder 58 of the second takeup stand is actuated to swing the arm 56 downwardly so that the takeup coil will bear on the drive roller 60 of the second takeup stand.

All of this is accomplished while the first web 130 is being fed along the first transport path. When the first web 130 has been completely fed through the apparatus onto the takeup coil 134, the control means 65 is actuated to start processing the second web 136. The control means commands the drive motor 62 of the second takeup stand to start and accelerate the drive roller 60 and hence the web 136, and simultaneously commands the stepper motor 108 (FIG. 3) to start raising the cross beam 98, the first beam splitter 90 and the first mirror 92. Thus, the first beam splitter and first mirror are moved to their respective second positions (indicated in broken lines in FIG. 3) while the web 136 is being accelerated along the second transport path by the second takeup stand 52. When the first beam splitter 90 and the first mirror 92 have reached their second positions, they will be laterally displaced from the beam path of the laser unit 88 and they will therefore no longer intercept the light emitted by the laser. Instead, such light will impinge on the second beam splitter 118 and will therefore travel along the second route, through the lenses 122 and 124 and into the second treatment zone 86 aligned with the second transport path. Thus, the web 136 will be perforated in the same manner as was the web 130.

While the web 136 is being fed along the second transport path between the takeup stands 24 and 52, the preceding web 130 is unloaded from the apparatus by removing the takeup coil 134 from the takeup coil support shaft 40 of the first takeup stand 38. The first carrier 78 is returned to the upstream end of the first transport path by the chain 66 and the associated drive apparatus. A new supply coil holding a new web is loaded onto the supply coil shaft 26 of the first payout stand 22 and the new web is threaded along the first transport path with the aid of the carrier 78 and then engaged with the first takeup stand in much the same manner as the web 136 was threaded. Once this has been accomplished, the new web is now in position to be fed from the first payout stand 22 to the first stand 38.

When the web 136 on the second transport path has been completely fed, the control apparatus signals the motor 48 of the first takeup stand to start accelerating the new web along the first transport path and signals the stepper motor 108 (FIG. 3) to start moving the first mirror 92 and the first beam splitter 90 back to their respective first positions so as to again direct the light from the laser to the first treatment zone 84. The mirror 92 and the beam splitter 90 will move to their respective first positions while the new web on the first transport path is being accelerated to full processing speed.

Of course, an infinite series of semi-continuous webs can be processed by simply repeating the steps described above. As will be readily appreciated, the apparatus will continue to process a web on one transport path while a web previously processed on the other transport path is being unloaded from the takeup stand associated with such transport path and while a new web is being loaded onto the payout stand associated with such other transport path and threaded along such other transport path.

Numerous variations and combinations of the features described above can be utilized without departing from the present invention. For example, if the beam directing apparatus is sufficiently reliable, and if the configuration of the transport paths permits manual threading, the mechanical threading devices described above may be omitted.

Also, although the apparatus described above utilizes light in treating the web, other forms of radiant energy can be utilized in the apparatus according to the present invention. Merely by way of example, such other forms of radiant energy may include electromagnetic radiation other than light. The term "optical element" as used herein should be understood as referring to any element which is capable of influencing the direction of the radiant energy utilized in the apparatus.

Thus, the foregoing description of the preferred embodiments should be understood by way of illustration, rather than limitation, of the present invention as defined in the claims.

What is claimed is:

1. Web transport and treatment apparatus comprising:
    (a) a web support structure defining at least two independent web transport paths;
    (b) means for emitting radiant energy;
    (c) means for selectively directing such radiant energy along at least two separate routes, a first one of said routes extending into a first treatment zone aligned with a first one of said transport paths, a second one of said routes extending into a second treatment zone aligned with a second one of said transport paths;
    (d) at least two payout stands;
    (e) at least two takeup stands, a respective one of said payout stands and a respective one of said takeup stands being associated with each of said paths so that a web can be fed along either one of said paths by the payout and takeup stands associated therewith; and
    (f) control means for actuating said payout and takeup stands to feed a series of webs along alternate ones of said paths so that each web is fed along one of said paths while the payout and takeup stands associated with another one of said paths are idle, said control means also being operative to coordinate the operation of said directing means to direct said radiant energy into the treatment zone aligned with each of said paths while a web is being fed along such path, whereby each web in the series may be loaded onto an idle payout stand and threaded along the path associated with such stand while another web in the series is being fed along another path and treated by said radiant energy.

2. Apparatus as claimed in claim 1 wherein said emitting means includes means for emitting a beam of radiant energy on a fixed beam path and said means for selectively directing includes an optical element and means for moving said optical element between a first position and a second position so that when said optical element is in said first position the beam will be directed along said first route by said optical element and when said optical element is in said second position the beam will be directed along said second route.

3. Apparatus as claimed in claim 2 wherein said first position is aligned with said fixed beam path and said second position is remote from such path, so that said optical element will intercept said beam when it is in its first position and said optical element will not intercept the beam when it is in its second position.

4. Apparatus as claimed in claim 3 wherein said optical element is a mirror.

5. Apparatus as claimed in claim 4 wherein said means for selectively directing includes a beam splitter and means for moving said beam splitter in coordination with said mirror so that said beam splitter will be aligned with said fixed beam path in front of said mirror when said mirror is in said first position but said beam splitter will be remote from said fixed beam path when said mirror is in said second position.

6. Apparatus as claimed in claim 2 in which said control means is operative to coordinate the operation of said takeup stands with the operation of said beam directing means so that the takeup stand associated with each of said transport paths will accelerate a web extending along such path while said optical element is being moved to the position in which radiant energy will be directed into the treatment zone associated with such path.

7. Apparatus as claimed in claim 1 further comprising means for mechanically threading a web along each one of said paths from a point upstream of the treatment zone associated therewith to a point downstream of such treatment zone.

8. Apparatus as claimed in claim 7 wherein said means for mechanically threading includes a pair of carriers, one such carrier being associated with each of said transport paths, means for engaging the leading end of a web extending from the payout stand associated with each of said transport paths with the carrier associated with such path while such carrier is disposed at the upstream end of such path and means for moving each carrier from the upstream end of the associated path to the downstream end thereof.

9. A method of treating each one of a series of semi-continuous webs with radiant energy comprising the steps of:
(a) alternately threading and feeding the webs along two independent transport paths so that each web is threaded along one of the paths while the preceding web of the sequence is being fed along the other one of the paths; and
(b) alternately directing radiant energy at either of two treatment zones, each such treatment zone being aligned with one of said transport paths, so that the radiant energy is directed into the treatment zone aligned with each path while a web is being fed along such path.

10. The method as claimed in claim 9 wherein said radiant energy is emitted from a fixed source, said radiant energy is directed towards one of said treatment zones by positioning an optical element at a first position and said radiant energy is directed towards the other one of said treatment zones by positioning said optical element at a second position different from said first position.

11. The method as claimed in claim 10 wherein said optical element is moved to the position in which radiant energy will be directed towards one of said transport paths while a web which has been previously threaded onto such path is accelerated therealong.

12. A method as claimed in claim 9 wherein each web is fed along one of said treatment paths by a payout stand and a takeup stand associated with such path, further comprising the steps of unloading and reloading the payout and takeup stands associated with each of said transport paths while feeding another web of the sequence along the other one of said transport paths.

13. A method as claimed in claim 9 wherein each web of the sequence is threaded mechanically along one of said paths from a point upstream of the treatment zone associated with such path to a point downstream of such treatment zone.

* * * * *